Aug. 1, 1967   H. FUNFSTUCK   3,334,312
APPARATUS FOR PRODUCING A DIRECT-CURRENT VOLTAGE
PROPORTIONAL TO BUT DIFFERENT FROM
ANOTHER DIRECT-CURRENT VOLTAGE
Original Filed June 22, 1964   3 Sheets-Sheet 1

HORST FUNFSTUCK
INVENTOR.

BY
ATTORNEY

Aug. 1, 1967   H. FUNFSTUCK   3,334,312
APPARATUS FOR PRODUCING A DIRECT-CURRENT VOLTAGE
PROPORTIONAL TO BUT DIFFERENT FROM
ANOTHER DIRECT-CURRENT VOLTAGE
Original Filed June 22, 1964   3 Sheets-Sheet 2
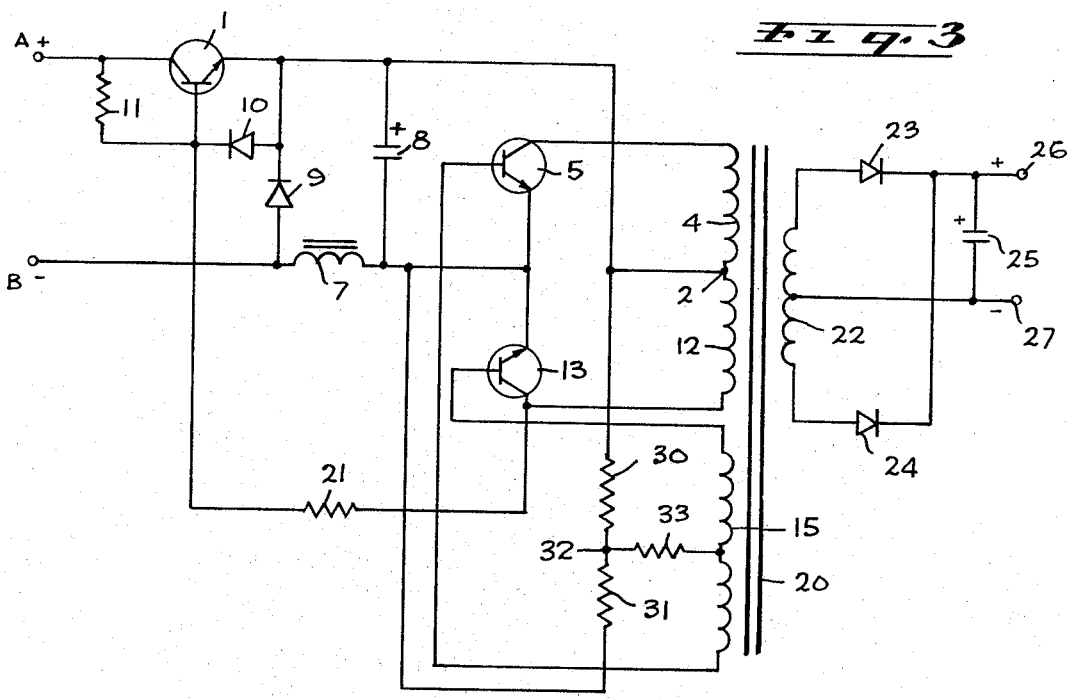
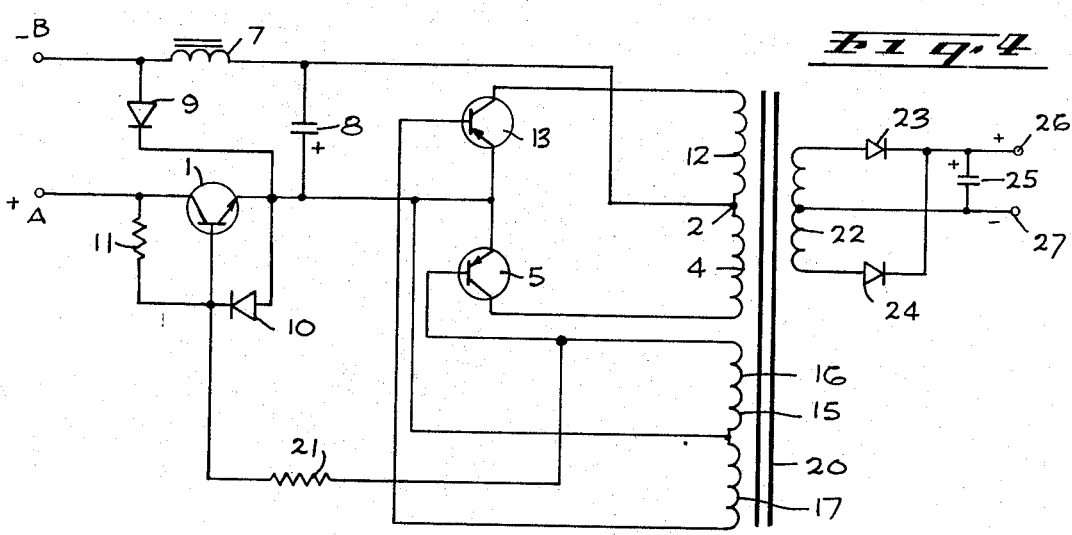
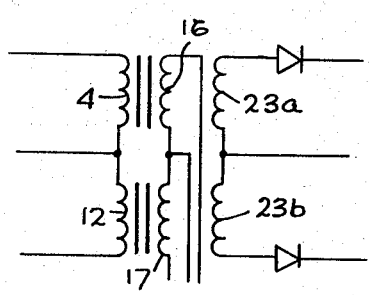
INVENTOR.
HORST FUNFSTUCK
BY
ATTORNEY Aug. 1, 1967 H. FUNFSTUCK 3,334,312
APPARATUS FOR PRODUCING A DIRECT-CURRENT VOLTAGE
PROPORTIONAL TO BUT DIFFERENT FROM
ANOTHER DIRECT-CURRENT VOLTAGE
Original Filed June 22, 1964 3 Sheets-Sheet 3

HORST FUNFSTUCK
INVENTOR.

BY Philip Subkow

ATTORNEY

United States Patent Office
3,334,312
Patented Aug. 1, 1967

3,334,312
APPARATUS FOR PRODUCING A DIRECT-CURRENT VOLTAGE PROPORTIONAL TO BUT DIFFERENT FROM ANOTHER DIRECT-CURRENT VOLTAGE
Horst Funfstuck, Los Angeles, Calif., assignor to Statham Instruments, Inc., Los Angeles, Calif., a corporation of California
Continuation of application Ser. No. 376,987, June 22, 1964. This application July 27, 1966, Ser. No. 568,350
7 Claims. (Cl. 331—113)

ABSTRACT OF THE DISCLOSURE

Apparatus for producing one direct-current voltage proportional to a different direct-current voltage including a transistor inverter, a gating device operated by the inverter and a transformer coupled output having a smoothing circuit connected therefrom.

---

This application is a continuation of copending application Ser. No. 376,987 filed June 22, 1964, now abandoned, by Horst Funfstuck for "DC-to-DC Converter." The said application Ser. No. 376,987 is in turn a continuation-in-part of copending application Ser. No. 340,323 filed Jan. 27, 1964, now Patent No. 3,289,105, by Horst Funfstuck. The benefit of the filing dates of both of said pending applications is therfore hereby claimed for this application.

This invention relates to a transistorized saturated core, DC to AC inverted. Particularly, it relates to an inverter in which low voltage DC current is inverted to form an alternating current which can be transformed to the desired voltage level. The rectification of the alternating current can be obtained and filtered to produce a direct current of desired magnitude, resulting in a DC to DC converter.

The AC generator in the system of my invention includes a saturable core transformer, such as the toroidal or DU-lamination type, connected to transistors arranged in push-pull configuration. The collector emitter circuit of the transistors are connected in series through the saturable core transformer and through an intermediate tap of the transformer to the power source. An output secondary is provided and a control secondary is also provided. The control AC at the control primary is applied to the bases, so that, on one half of the control AC cycle, the positive DC potential at the base of one of the transistors is increased so that the transistor is maintained in the forward biased saturated condition, and is "on," while the other transistor of the push-pull pair has its positive bias reduced to a negative bias by the control AC. The transistor is thus, back biased into the "off" condition.

This causes a current flow from the DC source through the primary of the transformer and the transistor which is in the "on" condition. This flow causes a rise in magnetizing current in the transformer until the transformer core becomes magnetically saturated. The voltage across the transformer primary rises steeply until the transformer core becomes saturated and ideally becomes equal to the DC supply voltage. When saturation occurs, flux variation in the transformer ceases and the transformer voltage falls to zero. This also results in the reduction in the potential across the control AC winding. The reduction of the transformer voltage, because of the stored energy in the transformer, reverses and causes a reversal of voltage in the control coil. This reversal results in the reversal of the bias in the base of the transistors so that the "on" transistor becomes reverse biased and the "off" transistor returns to the forward biased saturated condition. The conductive path through the primary of the transformer is now established through the transistor which now has become forward biased, and the cycle is re-established.

In a preferred embodiment of my invention a constant DC bias is established at the bases of each of the transistors, which, even in the absence of the control AC, is selected to be sufficient to drive each of the transistors to saturation. The control AC reverses the bias on one of the transistors, while the other transistor is maintained in the forward biased saturated condition.

The result of this switching is a square wave function at all windings of the transformer, which may be utilized in any manner, as for instance, it may be rectified and filtered to produce a DC voltage at the power level desired. By controlling the magnitude of the DC current supplied to the bases, I may obtain the desired output collector current from the transistors, giving effect to the beta of the transistors, thereby obtain the desired current or power output from the transformer secondary.

I may employ the means disclosed in my copending application to insure the existence of the desired DC current to the transistors. Since the $h_{\text{FE(SAT)}}$, i.e., beta of the transistors, is a function of the temperature, and decreases with decrease in temperature, and both the collector to emitter voltage at saturation $V_{\text{CE(SAT)}}$, and the base to emitter voltage at saturation $V_{\text{BE(SAT)}}$, increase with decrease in temperature, the current demand at the transistor base for forward bias increases in order to maintain the desired collector saturation current. For this purpose, I provide means for increasing the DC current to the base of the transistor, as is more fully described in my application Ser. No. 340,323 which is hereby incorporated in full by this reference. This is made possible by employing the DC source potential at the base of the transistor as in my preferred embodiment, of such magnitude as to insure that there will be sufficient DC current at the base to drive the transistors to saturation. The higher current required at low temperatures to saturate transistors at the base of the transistors, may thereby be provided.

The magnitude of the AC control signal required in my circuit is but a fraction of the DC supply. The drive current to the base of the transistors is the DC current on which is superimposed the AC control circuit current, so as to raise the positive value at the base of one of the transistors to maintain it in the "on" condition, and to reduce the positive value to a negative bias on the other transistor, and thus, place the transistor into the "off" condition.

When the voltage input to the converter is so high that the transistors employed in the DC inverter may be damaged, the voltage may be reduced by conventional means such as passive input resistors. However, this results in a large power loss if the voltage reduction is material. The efficiency of this system is diminished. In the system of my invention I cause this reduction in input voltage by means of substantially no power loss system by employing a chopper to intermittently block the power input source. The on and off time of the chopper is controlled to have a ratio by which it is desired to reduce the input voltage. The turn cycle of the chopper is controlled by the ratio of the positive and negative pulses issuing from the inverter. Thus, the input voltage may be chopped to be blocked for the desired fraction of time. The control frequency operates the chopper to pass the excitation potential for the period of the positive pulse and blocks it for the period of the negative pulse. The chopped pulses are then applied to an integrating condenser of an LC filter to which the input of the inverter is coupled. Thus, the voltage applied to the inverter is the average of the pulsed voltages established at the condenser. The average value depends on the pulse width ratio, that is, the ratio of the period of time which the chopper passes the input current to the period of time during which the chopper cuts off the input current.

To obtain this function, I employ a gating transistor and apply the square wave generated by the inverter to the base of the gating transistor. The ratio is determined by the ratio of the volt second value of the two parts of the tapped primary of the inverter.

This invention will be further described by reference to the drawings in which:

FIGS. 2, 3, 4, 5, 6 and 7 are a schematic wiring diagram of modifications of my invention.

Figure 1:
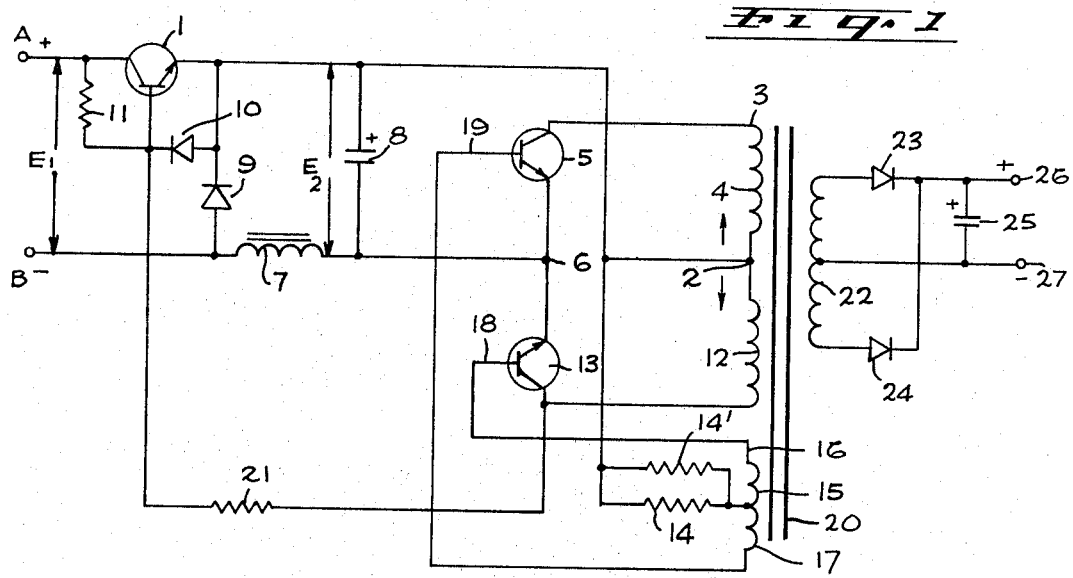
FIG. 1 is a schematic wiring diagram of my invention.

The positive A of the DC source potential shown in FIGS. 1, 2, 5 and 6 is connected through the collector emitter circuit of the NPN gating transistor 1, to the intermediate tap of the transformer primary 2. The primary is connected to the collector of the NPN transistor 5, and the collector of the NPN transistor 13. The positive terminal is also connected through the resistor 14, to an intermediate point, preferably the mid-point of the secondary 15. The secondary 15 is also connected to the base 18 of the transistor 13, and the base 19 of the transistor 5. The negative source terminal B is connected through the inductance 7 to the emitters of the transistors 5 and 13. The condenser 8 is connected between the emitter of the transistor 1 and the negative or other reference terminal between the emitters of transistors 5 and 13 and inductance 7 and to the emitter of transistor 1.

The biasing resistor 11 is connected across the base to collector circuit and the diode 10, across the base to emitter circuit and the diode 9 between the emitter and the negative, or other reference terminal B. The output secondary 22 is connected through a rectifier composed of the diodes 23 and 24, and if required, a ripple suppressor condenser 25, to the terminals 26 and 27. As will be seen, a positive DC current is establised at the bases 19 and 18 through the resistor 14, and the winding 16 and 17, of the secondary 15.

The bases of the transistors are in series with the resistor 14, the winding 16 and 17 of the secondary 15, and the positive of the condenser 8. The magnitude of the resistor 14, is such that, acting with the DC resistance of the transformer coils 16 and 17, the available potential causes sufficient base current to saturate the transistors 5 and 13.

The system is designed so that the collector circuits are not entirely symmetrical. Unless the internal DC resistance in the collector-to-emitter circuits, and the external resistance in series with each of the collectors are perfectly identical, i.e., the transistor circuits are symmetrical, there will be a net current flow in the transformer primary. In order to assure this effect, and not to rely on accidental mis-match of transistors or external resistances, I make the DC resistance of the transformer section 12, greater than 4 or vice versa.

The transistor circuit is thus unsymmetrical. For example, if the impedance in the current path through the collector of transistor 13 is greater than through collector of transistor 5, a $$\frac{dI}{dt} \times R$$

transient occurs through the primary when the DC current, at the bases 19 and 18, are both sufficient to saturate each of the transistors.

The above transient induces a voltage in the control secondary winding 15, which modulates the DC applied to the bases 18 and 19 of the transistors 5 and 13. Thus, it may, for example, add to the positive at the base 18 of transistor 13, and subtract from the positive at the base 19 of transistor 5. The transistor 13 is thus maintained in the saturated condition while the transistor 5 becomes reverse biased. The current flow from the positive of condenser 8 is then through the primary 2 and the transistor 13 to the negative, of the condenser 8. When the core 20 becomes saturated, the flux change becomes substantially zero, and the voltage (AC) across the transformer primary 2 falls to zero. The AC voltage across the control secondary 15, also drops to zero, and the DC supply is again established at bases 18 and 19. Both the transistors 5 and 13 are brought to the forward biased condition. However, substantially simultaneously, depending on the switching times of the circuit, the collapse of the voltage across the transformer primary 2 has induced a reverse polarity at the primary resulting from the collapse of the magnetic field in the core. A reverse potential induced in 15 is applied as a control potential to 18 and 19. The positive potential in the base 19 is maintained to hold the transistor 5 in saturated condition, and the control potential at the base 18 subtracts from the positive DC at the base 18 to place the transistor 13 in the back biased or "off" condition. The DC current flow from the positive through the transistor 5, thus induces a change in the magnetic field to cause a voltage in the control secondary 15, which is in the direction to hold the transistor 5 in the saturated condition and the transistor 13, in a non-conductive i.e., "off" condition. This continues until the transformer core becomes saturated and the magnetic field collapses, as described above, completing the cycle.

The induced AC in 22 is rectified by the diodes 23 and 24, and ripple may be suppressed by the condenser 25, and the rectified DC appears at 26 and 27.

It will be recognized, that whereas for purposes of explanation, the reversal of the polarity of the potential and the magnetic field is stated to occur at the saturation of the core of the transformer, this effect may occur at some value of the magnetic field less than saturation, depending on the conditions which introduce a limit to the magnetizing current through the primary. Thus, when the magnitude of the magnetizing current has reached its limit, the increase in the flux in the core has reached its limit and cannot further increase, this will have the same effect as would saturation of the core.

The resistors function together with any other DC resistance i.e., that of the control secondary windings 16 and 17, to establish the DC bias at the bases 18 and 19. This is designed to be in magnitude sufficient to provide the base current, which, in the absence of any AC from the control coil 15, is sufficient to forward bias, both transistors to saturation. Additionally, if the collector current is required to supply a given current at 26 and 27, the current flow to the base must be sufficient, giving consideration to the beta of the transistors, to provide the collector current demand.

Thus, by way of example only, and not as a limitation of my invention, if the collector current is to be 30 milliamperes and the beta is 10, then the base current should be substantially 3 milliamperes. With a supply voltage of 28 volts between 6 and 2, and ignoring the resistance of the control coil 15 and the leads, the resistor 14 should have a resistance value of about 10K sufficient to establish 3 milliamperes at the bases of the transistor.

The AC control voltage, peak to peak, should be sufficient to remove this positive potential. Thus, for example, if the peak to peak potential at the control secondary is 6 volts, i.e., 3 volts between the center tap, and the ends of the windings 16 and 17, the base to emitter bias at 5 may go positive 1 volt, and the base to emitter bias will go negative 5 volts. On the reverse negative half cycle, the condition of the transistors are reversed. If this system is exposed to large ambient temperature changes, the characteristics of the transistors change as stated above, and in order to maintain the collector current, for example, the 30 milliamps as given in the above example, the base current and the base potential must change in the proper direction and magnitude.

Thus, when the system is subjected to low temperature, the value of the $V_{BE(SAT)}$ increases roughly at the rate of about 2 to 3 millivolts per degree centigrade. The value of $h_{FE(SAT)}$ i.e., beta of the transistors decreases with decrease in temperature. The $V_{CE(SAT)}$ increases with decrease in temperature. If the variation in $h_{FE(SAT)}$ as a function of temperature were not significant, the effect of temperature on the $V_{BE(SAT)}$ and the $V_{CE(SAT)}$ may be minimized by making the DC voltage $E_2$ across the condenser 8 large enough so that the above parameter variations are but a small fraction of the available DC. A temperature insensitive resistor of sufficient magnitude to supply the required current at the base circuit, may be sufficient to act as the resistor 14. However, when the variation of $h_{FE(SAT)}$ is great, this procedure is not practical, for the efficiency of the system will then decrease excessively. One, may however, employ a resistor of resistance value which, at the lowest temperature, to which the system is to be exposed, for example, cryogenic temperatures of about −300° Fahrenheit or lower, would be sufficient so that the required base current is obtained through the insensitive resistor. This will create a much larger collector current capability than is required at ambient temperatures, for example, 75° Fahrenheit. The current flow in the collector circuit will depend upon the current demand in the system. The system will thus be very inefficient at temperatures higher than the chosen low temperature, for example, at ambient room temperature 75° Fahrenheit.

The efficiency is, however, greatly improved, and the collector current maintained substantially constant over wide ranges of temperature from cryogenic temperatures, for example, from −300° F. to temperatures much above room temperature, for example, +300° Fahrenheit, by modifying the base current, and therefore the base voltage, so that the base current and voltage increase as the temperature falls and decrease as the temperature rises. This is accomplished by making the resistance of resistor 14, temperature sensitive so that the resistance decreases with reduction in temperature and vice versa, increases with increase in temperature. Such a resistor is here termed a positive resistor.

The rate of change of the resistance of the positive resistor is chosen so that the base current increases to meet the requirements of the transistors, due to the effect of the temperature on the transistor parameters. The temperature variation of $h_{FE(SAT)}$ for transistors depends on the characteristics of the transistor. It may be positive but non-linear. The variation of the $h_{FE(SAT)}$ over different temperature intervals may differ markedly. Ideally, I desire that the resistance of resistor 14, vary so as to cause a base current which increases in value as the $h_{FE(SAT)}$ decrease or vice versa, sufficient to maintain saturation. The variation in the parameters of the transistors is, in most cases, much greater in going from 32° Fahrenheit to −300°, than in going from 32° Fahrenheit to +300° Fahrenheit. However, for many positive resistors, the reverse is true for the temperature coefficient of resistance. The average rate of change of resistance in going from 32° to +320° is much less than in going from 32° to −300°. Thus, for example, the rate of change of resistance in going from 32° to 300° may be twice that in going from 32° to −300°.

In order to adjust temperature coefficient of resistance more closely to the temperature coefficient of the transistor parameters, I have modified the temperature coefficient of such positive resistor so that it more closely matches the temperature coefficient of the transistor parameters. This may be accomplished by shunting the positive resistor with a resistor which is substantially temperature insensitive, as for example, a carbon resistor. The temperature coefficient of the parallel resistance circuit may thus be made to approach that required to compensate for the change in the transistor parameters.

The resistance of the parallel resistors at any temperature T above the temperature which $R_1$ and $R_2$ is measured, is given by the following formula:

$$\frac{R_1 R_2 (1+BT)}{R_1 + R_2 (1+BT)}$$

In the above case, $R_1$ is the resistance of the temperature insensitive resistor, for example, 14′ and $R_2$, the resistance of positive resistor, for example 14, having a temperature coefficient B over the temperature interval T from the temperature at which $R_2$ is measured. The total value of both resistors in parallel is chosen to obtain the saturation at the bases of 18 and 19, as described above, and the variation in the resistance of the parallel resistors 14′ and 14, compensates for the changes in $h_{FE(SAT)}$ and $V_{BE(SAT)}$. Thus, as the temperature decreases, causing a decrease in the value of $h_{FE(SAT)}$, and an increase in the value of $V_{BE(SAT)}$, the effective resistance of the parallel resistors 14′ and 14 decreases sufficiently to satisfy the saturation requirements of the transistors, and to give the desired collector current as stated above.

Figure 2:
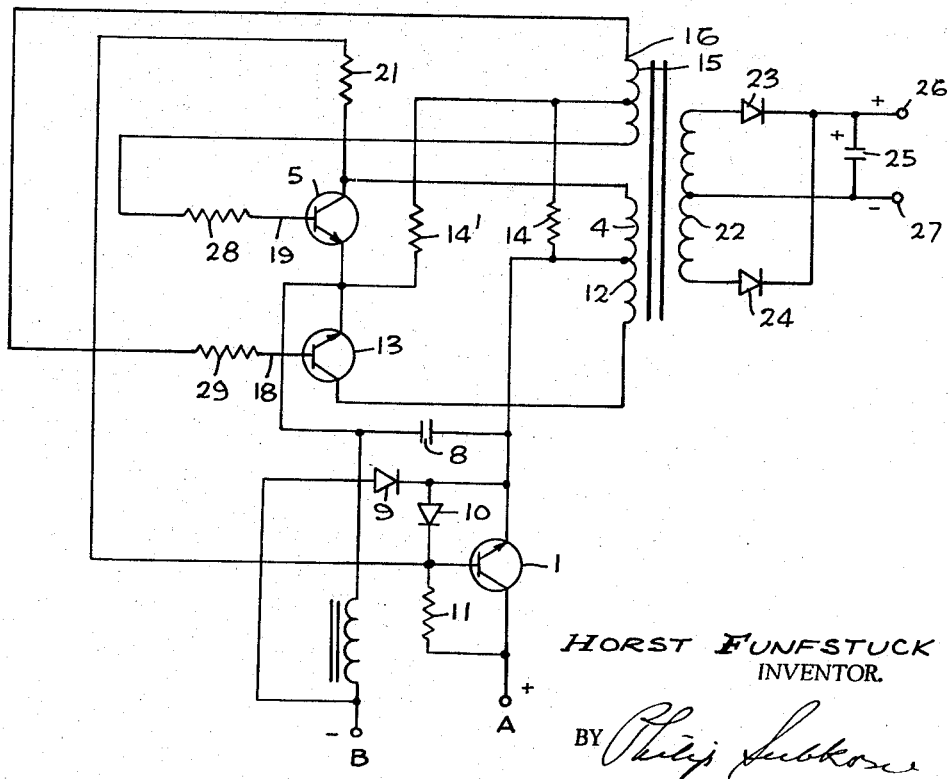

A similar compensation for variations in the transistor parameters is shown in the modified circuit of FIG. 2. FIG. 2 is substantially the same as in FIG. 1, and all identical parts are similarly numbered, and the two circuits function in the same way. The variation is in the position of the resistors 14 and 14′ which are not placed in parallel, but one in series with each of the poles of the supply DC, and in series with each of the bases through the mid-point connection to the control secondary 15. Additional resistor 28 is placed in series with the base 19, and resistor 29 is placed in series with the base 18. In this circuit, the $h_{FE(SAT)}$ is compensated by the positive resistors 28 and 29, and the $V_{BE(SAT)}$ is compensated by the insensitive resistor 14′ and the positive resistor 14. Resistor 14′ may, in some cases, be omitted. As temperature falls, the resistors 28, 29 and 14 fall in resistance, causing an increase in the base current at 19 and 18, to compensate for the fall in $h_{FE(SAT)}$ and the increase in the value of $V_{BE(SAT)}$.

FIG. 3 shows a further modification of the circuit of FIG. 1 in which a thermistor having a negative temperature coefficient i.e., one whose resistance decreases as the temperature increases, is employed to cause an increase in the DC current to the bases of transistors 5 and 13. The negative resistor 31 forms the lower leg of the voltage divider in series with the negative terminal of the condenser 8. The upper leg of the voltage divider is a temperature insensitive resistor 30. The tap 32 of the voltage divider is connected to the mid-point of the control secondary 15, as in FIG. 1 through a resistor 33 which is temperature insensitive. The remainder of the circuit is the same as in FIG. 1. The voltage at 32 moves as temperature varies to change the resistance of 31, thus adjusting the current passing through 33 and 15. As the temperature decreases, the potential at 32 becomes more positive, increasing the current through resistor 33.

Th variation in resistance of the thermistor 31, with change in temperature, may be modified if desired, by placing a temperature insensitive resistor in parallel or in series with resistor 31, or both may be employed. The resistor 31, as illustrated in FIG. 3, should be read as including the above additional resistances where their use is indicated to adjust the voltage change at 32 to compensate or minimize the changes in transistor parameters.

Where, in this specification, a temperature insensitive resistor is referred to, it will be understood to mean one having a low temperature coefficient such as is commonly referred to in this art as a temperature insensitive resistor.

FIG. 4 is an alternative form of the circuit of my invention employing a form of inverter in which the tap of the control secondary is connected to the emitter potential instead of to the collector potential to which the tap of the primary in FIG. 1 to FIG. 3 is connected.

It will be observed that the circuit of FIG. 4 is the same as that of FIG. 1 with the following exceptions. Like numbers indicate like components in FIG. 4 as in FIG. 1. The switching signal is derived from collector of 5 as shown.

The switching signal in FIGS. 1, 2 and 3 could be obtained from the collector of the other transistor and thereby change the ratio of the positive and negative pulses at the base of transistor 1.

In the form of FIGS. 1–3 of the inverter, the NPN push pull transistors 5 and 13 are saturated by the DC applied to the base to the transistors 5 and 13, and unsaturated by the AC derived from the control secondary.

Similarly, in FIG. 4, resistor 21 could be connected to the opposite end of the winding 15.

In the form of FIG. 4 no DC is applied to the bases of the PNP transistors 5 and 13, and only the AC derived from the control secondary switches the transistors. This absence of the DC at the bases thus requires the imposition of initial transient to start the inverter and requires that the AC amplitude be sufficient to move the base potential through a swing to move the transistor from saturation to cutoff.

The circuit of FIGS. 1–3 have the advantage over the circuit of FIG. 4 in that they permit the use of the temperature compensating used in FIGS. 1–3 over a wider range of ambient temperatures. If the temperature compensating resistors of FIGS. 1–3 to wit, 14, 14′ and 31 are used with the circuit of FIG. 4, the compensation which may be obtained is limited to a range of temperatures which is but a fraction of the temperature range compensable in the circuits of FIGS. 1–3 at like power levels, for example, about ½ for circuits of like sophistication, as shown in the above figures.

However, in all of these forms, the use of my voltage control circuit will protect the transistor as described above.

The gating transistor 1 and the LC circuit composed of condenser 8 and inductance 7, and the associated circuti components act to reduce the potential at the input to a value dependent on the ratio of the volt second value of the transformer primary portion 4 to that of the portion 12.

Figure 6:
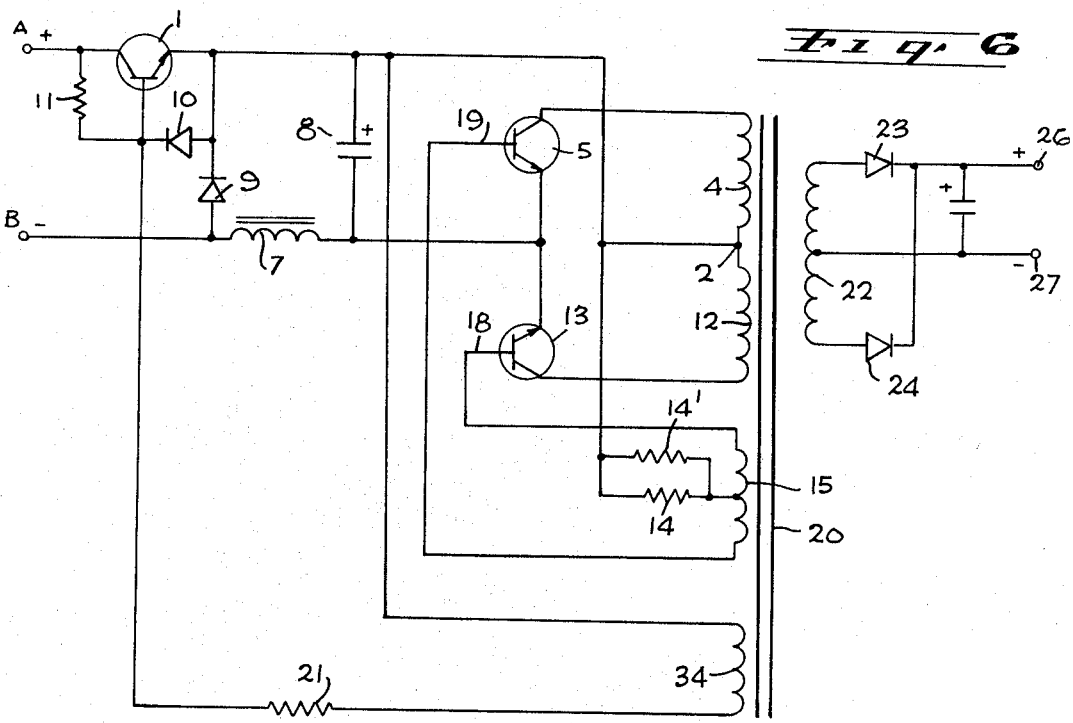

For this purpose, I employ a chopper at the input to chop the input voltage so that the ratio of the period during which the chopper is conductive to that during which it is non-conductilve will reduce the voltage by the desired fraction. In my preferred embodiment, I employ a gate controlled by the square wave generated by the DC inverter. Alternative forms of choppers, such as are shown in FIG. 6, and described below, may be employed. Thus, if $E_2$ is the voltage at the condenser 8 and $I_2$ is the load current flow from said condenser, and $E_1$ is the voltage between A and B, and $I_1$ is the coresponding input current, and $V_1$ is a volt second value of the portion 12 of the primary connected to the base of the gating transistor, and $V_2$ is a volt second value of the other portion 4 of the primary, the $$E_2 = \left[\frac{V_1}{V_1+V_2}\right] E_1$$

and $$\frac{I_1}{I_2} = \frac{V_1}{V_1+V_2}$$

$$E_1 I_1 = E_2 I_2$$

Where the ratio $$\frac{V_1}{V_1+V_2} \text{ or } \frac{V_2}{V_1+V_2}$$

is ½, the primary is herein referred to as asymmetrical, and where this ratio is more or less than ½, it is herein referred to as unsymmetrical.

The volt second value can be made different by employing unsymmerical portions of the primary. This can be achieved by employing different number of turns in each of the primary parts, or by employing the same number of turns wound on different cores, or by employing both unsymmerical cores as above, and also unsymmetrical turn values as above.

Thus, in FIGS. 1–4 the unsymmetry is made by different number of turns 4 and 12, or by employing a split transformer 4 and 12, as in FIG. 5, whereas in FIG. 1, 16 and 17, the parts of the control secondary and 23a and 23b form the secondary in series, are equivalent to the secondary 22.

In all of the above circuits of FIGS. 1–4, where the same core is employed, the width of the positive pulse, that is, the time interval or period of the positive and following negative pulses of the square wave, are dependent on the number of turns of the windings 11 and 12 which determines the volt second capacity of the primary section. If the number of turns are the same, the pulses will be of equal width. The pulse width of the positive and negative pulses will have a ratio proportional to the ratio of the turns in 11 and 12, and in this way, the characteristics of the pulse train can be adjusted by selecting the ratio of the turns of 11 and 12.

The output at the collector of transistor 13 is thus a square wave which is applied to the base of the transistor 1 through the resistor 21.

When the positive pulse is applied to the base of the transistor 1, the transistor is saturated and becomes conductive, and a condenser 8 is charged through the inductor 7. When the field collapses in the primary 3, the potential at the collector of 13 falls substantially to zero and transistor 1 is cut off. However, the charged condenser 8 maintains the DC potential at the tap 2 of the transformer primary and thus the transistor 13 is on while the transistor 5 is cut off. The capacity of the condenser 8 and the inductance circuit is such that the resonant frequency of the LC circuit is but a minor portion, for example, 1 to 5% of the frequency of the square wave output at the collector at 13. The drain on the condenser during the period that transistor 1 is non-conductive is but a small fraction of the total charge on the condenser, so that the voltage at the condenser does not vary substantially. Thus, for example, it may vary 10% or less of the total voltage at the condenser, and this does not materially effect the wave shape at the collectors 5 and 13.

The result is that the bases 18 and 19 see a substantially constant DC current from the condenser 8 through the control secondary. However, when the field again collapses in 20 and the transistor 13 is off, and the transistor 5 is on, establishing the potential at the base of 1, to saturate 1, the square wave pulse cycle at the emitter is completed.

The capacitor 8, in connection with the conductor 7, acts as a voltage integrating network. The potential therefore depends upon the ratio of the pulse widths of the positive and negative pulses. The average value of the potential at the capacitor depends upon the fraction of time of each cycle during which the transistor 1 is conductive. The period depends upon the relative intervals of time required for the flux of the primary portions 4 and 12 to arrive at saturation. This in turn depends upon the volt second function of the transformer parts 4 and 12. That is, the period of time at the potentials across the primary parts which is required to arrive at saturation or such other fraction of the saturation, at which the field collapses.

The proportioning of the periods of positive and negative pulses may be obtained by designing the transformer with symmetry at the portions 4 and 12, except for the number of turns. It may also be obtained by making the portions otherwise unsymmetrical, so that even with like number of turns, the rate of change of flux in each of the parts of the primary is different. This manner of controlling the rate of change of flux in the transformer primary is well understood and needs no further elaboration for those skilled in the art.

Thus, both the core design and the number of turns may be employed in controlling the pulse width of the positive and negative portions of the square wave at the control collector to determine the period during which the transistor 1 is conductive.

FIG. 5 illustrates a configuration which the primary is split into two sections 4 and 12, having like number of turns but in which the core characteristics are such as to give different volt second values. The control secondary 16 and 17, and the output secondary are wound inductively coupled as in FIGS. 1 to 4 with the primary, and the remainder of the circuit of FIG. 5 may be either those of FIGS. 1 to 3 or 4.

Thus, in FIGS. 1–3 the potential at the capacitor 8 is equal to the fraction $$\left[\frac{N_{12}}{N_4+N_{12}}\right]E_1$$

where $N_4$ and $N_{12}$ are the number of turns in the windings 4 and 12 respectively, and $E_1$ is the input voltage at the collector of 1.

In FIG. 4 it is $$\left[\frac{N_4}{N_4+N_{12}}\right]E_1$$

and in FIG. 5 if the remainder of the circuit of FIGS. 1–3 is employed, it is $$\left[\frac{V_{12}}{V_4+V_{12}}\right]E_1$$

where $V_4$ and $V_{12}$ are the volt second of the primary 4 and 12 respectively, and in FIG. 4 is $$\left[\frac{V_4}{V_4+V_{12}}\right]E_1$$

Where, in the above description and drawings, polarities are indicated or stated, they are as shown for the NPN transistors. PNP or NPN transistors may be employed with the polarities.

FIG. 6 illustrates the fact that the switching potential at the base of transistor 1 need not come conductively from the primary as shown on FIGS. 1–5. The square wave may be obtained by coupling to the primary other than by conductive connection. FIG. 6 illustrates an inductive coupling by means of the switching secondary coupled inductively instead of conductively coupled to the primary and connected to the emitter and base of transistor 1. The remainder of the circuit may be of any of the forms of FIGS. 1–4. As illustrated, it conforms to FIG. 1, like components bear like numbers. The square wave generated in the primary by the switching action of the transistor is applied to the base of 1 and functions as described for FIGS. 1–5.

Figure 7:
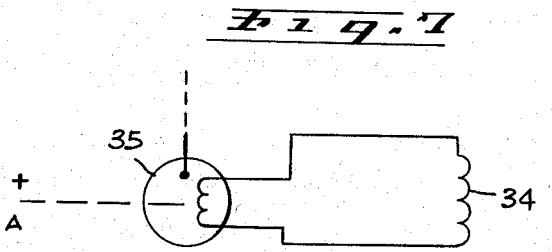

Instead of using a transistor gate 1 as the chopper of the input to the condenser 8, any other form of chopper having a like function may be used. Thus, FIG. 7 illustrates a mechanical chopper 35, the motor case being energized by a current derived from the primary as in FIGS. 1–5, or the secondary 34 as in FIG. 6. The remainder of the circuit may be as in FIGS. 1–5, with like components bearing the same number.

Chopper 35 may be entirely conventional. As is evident from FIGS. 6 and 7, chopper 35 may be energized through winding 34. If desired, winding 34 may be employed in all of the embodiments of FIGS. 1–6, inclusive. In such a case, the horizontal dotted line in FIG. 7 may represent the connection from terminal A to the vibrating reed in chopper 35. The vibrating reed may simply act as a pole to connect the contact represented by the vertical dotted line in FIG. 7. The contact of the vertical dotted line may be connected to the positive side of condenser 8.

In the operation of chopper 35, chopper 35 will be energized by a square wave which will cause terminal A to be connected to the positive side of condenser 8 for a predetermined time during the cycle of the inverter.

As is conventional, the chopper reed is vibrated by the energized winding thereof connected to winding 34.

While I have described particular embodiments of my invention for the purpose of illustration, it should be understood that various modifications and adaptations thereof may be made within the spirit of the invention, as set forth in the appended claims.

What is claimed is:

1. A circuit for converting a first direct-current voltage to a second direct-current voltage having an amplitude proportional to but different from said first voltage, said circuit comprising: first and second transistors, each of said first and second transistors having a collector, an emitter and a base; a saturable core transformer having a primary winding and a plurality of secondary windings, one of said secondary windings being a control secondary winding, another of said secondary windings being an output secondary winding; rectifying means connected with said output secondary winding, one of said collectors being connected to one end of said primary winding, the other of said collectors being connected to the other end of said primary winding; first circuit means connected between one end of said control secondary winding and one of said bases; second circuit means connected between the other end of said control secondary winding and the other of said bases; first and second direct-current input terminals; a chopper connected from said input terminals; an integrator connected from said chopper, said integrator having two output leads; a tap on said primary winding intermediate the said ends thereof, said primary winding tap being located on said primary winding in a position such that the direct-current resistance from said primary winding tap to said one end of said primary winding is different from the direct-current resistance of that portion of said primary winding between said primary winding tap and said other end thereof; third circuit means connected between one of said integrator output leads and said primary winding tap; a jumper lead connected between the other of said integrator output leads and both of said emitters, said chopper being connected to one end of one of said primary and control secondary windings at a position to cause said chopper to run at a constant rate independent of the amplitude of the voltage appearing across said output secondary winding and proportional to the ratio of said direct-current resistances; a tap on said control secondary winding intermediate the ends thereof; and fourth circuit means connected between at least one of said integrator output leads and the tap on said control secondary winding.

2. The invention as defined in claim 1, wherein said first, second and third circuit means are each conductive leads, wherein said fourth circuit means includes two resistors connected in parallel from the tap on said primary winding to the tap on said control secondary winding, and wherein said chopper is connected to one end of said primary winding.

3. The invention as defined in claim 1, wherein said first circuit means is a resistor connected from one end of said control secondary winding to one of said bases, wherein said second circuit means is a resistor connected from the other end of said control secondary winding to the other of said bases, wherein said third circuit means is a conductive lead, wherein said fourth circuit means includes a resistor connected from the tap on said primary winding to the tap on said control secondary winding, and a resistor connected from said emitters to the tap on said control secondary winding, and wherein said chopper is connected to one end of said primary winding.

4. The invention as defined in claim 1, wherein said first, second and third circuit means are each conductive leads, wherein said fourth circuit means includes first and second resistors connected from the tap on said primary winding to said emitters and a third resistor connected from the junction of said first and second resistors to the tap of said control secondary winding, said chopper being connected to one end of said primary winding.

5. The invention as defined in claim 1, wherein all of said first, second, third and four circuit means are conductive leads, and wherein said chopper is connected to one end of said control secondary winding.

6. The invention as defined in claim 1, wherein first, second and third circuit means are all conductive leads, wherein said fourth circuit means includes two resistors connected in parallel from the tap on said primary winding to the tap on said control secondary winding, and wherein said transformer has an additional secondary winding connected from the tap on said primary winding to said chopper.

7. A circuit for converting a first direct-current voltage to a second direct-current voltage having an amplitude proportional to but different from said first voltage, said circuit comprising: first and second transistors, each of said first and second transistors having a collector, an emitter and a base; a circuit for each collector; a circuit for each base; a saturable core transformer having a primary winding and plurality of secondary windings, said primary winding having first and second ends, one of said secondary windings being a control secondary winding, another of said secondary windings being an output secondary winding, said primary winding being in said collector circuits, said control secondary winding being in said base circuits; rectifying means connected with said output secondary winding; first and second direct-current input terminals; a chopper connected from said input terminals; an integrator connected from said chopper, said integrator having two output leads; and a tap on said primary winding intermediate the said ends thereof, said primary winding tap being located on said primary winding in a position such that the direct-current resistance from said primary winding tap to said first end of said primary winding is different from the direct-current resistance of that portion of said primary winding between said primary winding tap and said second end thereof, one of said integrator output leads being connected to both of said emitters, the other of said integrator output leads being connected to said primary winding tap, said chopper being connected to one end of one of said primary and control secondary windings at a position to cause said chopper to run at a constant rate independent of the amplitude of the voltage appearing across said output secondary winding and proportional to the ratio of said direct-current resistances.

References Cited

FOREIGN PATENTS 826,783   1/1966   Great Britain.

ROY LAKE, *Primary Examiner.*

J. B. MULLINS, *Assistant Examiner.*